US009930570B2

United States Patent
Champel (10) Patent No.: US 9,930,570 B2
(45) Date of Patent: Mar. 27, 2018

(54) METHOD AND APPARATUS FOR PACKET HEADER COMPRESSION

(71) Applicant: THOMSON LICENSING, Issy de Moulineaux (FR)

(72) Inventor: Mary-Luc Champel, Marpire (FR)

(73) Assignee: THOMSON Licensing, Issy-les-Moulineaux (FR)

(*) Notice: Subject to any disclaimer, the term of this patent is extended or adjusted under 35 U.S.C. 154(b) by 0 days.

(21) Appl. No.: 14/781,768

(22) PCT Filed: Nov. 22, 2013

(86) PCT No.: PCT/IB2013/002615
§ 371 (c)(1),
(2) Date: Oct. 1, 2015

(87) PCT Pub. No.: WO2014/170715
PCT Pub. Date: Oct. 23, 2014

(65) Prior Publication Data
US 2016/0044532 A1  Feb. 11, 2016

(30) Foreign Application Priority Data
Apr. 17, 2013 (EP) .................................... 13305502

(51) Int. Cl.
*H04W 28/06* (2009.01)
*H04L 29/06* (2006.01)
(Continued)

(52) U.S. Cl.
CPC ........... *H04W 28/06* (2013.01); *H04L 1/0084* (2013.01); *H04L 65/601* (2013.01);
(Continued)

(58) Field of Classification Search
CPC ... H04W 28/06; H04W 28/065; H04W 28/02; H04W 28/00; H04L 1/0002;
(Continued)

(56) References Cited

U.S. PATENT DOCUMENTS 6,882,637 B1* 4/2005 Le .......................... H04L 1/0082
341/60
7,061,936 B2* 6/2006 Yoshimura .............. H04L 29/06
370/349

(Continued)

FOREIGN PATENT DOCUMENTS

CA   2446517      11/2002
JP   2003008644   1/2003
(Continued)

OTHER PUBLICATIONS

Takeshi Yoshimura, Packet Loss Resilient RTP Header Compression over Wireless Links, Multimedia, Distributed, cooperative and Mobile (DICOMO) Symposium, 1997 to 2006 Edition, Ver. 1.1, Japan, Information Processing Society of Japan, Jun. 28, 2000, vol. 2000, pp. 295-300.

*Primary Examiner* — Wutchung Chu
(74) *Attorney, Agent, or Firm* — Brian J. Dorini; Xiaoan Lu (57) ABSTRACT

To compress headers efficiently, headers may be differentially encoded. In one embodiment, a difference between a current field and a reference field can be used in a reduced header. In another embodiment, the least significant bits of the current field can be used to represent the current field. When such a field is received, the most significant bits of a reference field are needed to de¬ compress the field. In addition, the present principles determine the typical usage scenarios that may benefit from header compression and further determine that some fields can be removed in a reduced header or be represented by fewer bits. Header
(Continued)

compression may impose constraints on the representation of the current field. The present principles recognize constraints on using reduced headers and provide rules and guidelines on applying header compression.

16 Claims, 8 Drawing Sheets

(51) Int. Cl.
*H04N 19/40* (2014.01)
*H04L 1/00* (2006.01)

(52) U.S. Cl.
CPC .......... *H04L 65/607* (2013.01); *H04L 65/608* (2013.01); *H04L 69/04* (2013.01); *H04L 69/22* (2013.01); *H04N 19/40* (2014.11)

(58) Field of Classification Search
CPC ... H04L 1/0003; H04L 1/0006; H04L 1/0009; H04L 1/0014; H04L 1/003; H04L 1/0007; H04L 47/36; H04L 47/365; H04L 29/0653; H04L 69/12; H04L 69/169; H04B 7/15521; H04N 21/2381; H04N 11/002; H03M 7/30
USPC .......... 370/465, 470–477, 389, 392
See application file for complete search history.

(56) References Cited

U.S. PATENT DOCUMENTS

| | | | |
|---|---|---|---|
| 7,586,899 B1* | 9/2009 | Mohaban | H04L 29/06027 370/352 |
| 7,738,391 B2* | 6/2010 | Melpignano | H04L 1/0014 370/252 |
| 7,835,399 B2* | 11/2010 | Rochon | H04L 69/22 370/392 |
| 2002/0191614 A1 | 12/2002 | Ido et al. | |
| 2003/0193950 A1* | 10/2003 | Philips | H04L 29/06 370/392 |
| 2003/0198250 A1* | 10/2003 | Hakenberg | H04L 29/06 370/457 |
| 2005/0160184 A1* | 7/2005 | Walsh | H04L 12/1868 709/247 |
| 2009/0185549 A1* | 7/2009 | Shon | H04L 69/04 370/349 |
| 2012/0201205 A1* | 8/2012 | Gopalakrishnan | H04L 1/1816 370/329 |

FOREIGN PATENT DOCUMENTS

| | | |
|---|---|---|
| JP | 2003304299 | 10/2003 |
| JP | 2001320419 | 11/2011 |
| WO | WO 2007112140 | 10/2007 |
| WO | WO 2012057703 | 5/2012 |

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            length             |      type     |f_i|F|A|R|P|E|S|
+-+-+-+-+-+-+-+-+-+-+-+-+-+-+-+-+-+-+-+-+-+-+-+-+-+-+-+-+-+-+-+-+
|  data_offset  |   frag_count  |  numDU  |      DU_offset       |
+-+-+-+-+-+-+-+-+-+-+-+-+-+-+-+-+-+-+-+-+-+-+-+-+-+-+-+-+-+-+-+-+
|  ...  |           DU_offset           |          ....           |
+-+-+-+-+-+-+-+-+-+-+-+-+-+-+-+-+-+-+-+-+-+-+-+-+-+-+-+-+-+-+-+-+
|                     payload_sequence_number                    |
+-+-+-+-+-+-+-+-+-+-+-+-+-+-+-+-+-+-+-+-+-+-+-+-+-+-+-+-+-+-+-+-+
|                         header_extension                       |
+-+-+-+-+-+-+-+-+-+-+-+-+-+-+-+-+-+-+-+-+-+-+-+-+-+-+-+-+-+-+-+-+
|                           payload data                    ....
+-+-+-+-+-+-+-+-+-+-+-+-+-+-+-+-+-+-+-+-+-+-+-+-+-+-+-+-+-+-+-+-+
```

FIG. 1A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              type             |             length             |
+-+-+-+-+-+-+-+-+-+-+-+-+-+-+-+-+-+-+-+-+-+-+-+-+-+-+-+-+-+-+-+-+
|                      header_extension_value                    |
+-+-+-+-+-+-+-+-+-+-+-+-+-+-+-+-+-+-+-+-+-+-+-+-+-+-+-+-+-+-+-+-+
```

FIG. 1B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          packet_id            |     packet_sequence_number     |
+-+-+-+-+-+-+-+-+-+-+-+-+-+-+-+-+-+-+-+-+-+-+-+-+-+-+-+-+-+-+-+-+
|    packet_sequence_number     |           timestamp            |
+-+-+-+-+-+-+-+-+-+-+-+-+-+-+-+-+-+-+-+-+-+-+-+-+-+-+-+-+-+-+-+-+
|           timestamp           |Q|F|P|FEC|  RES  |  TB  |  DS |R|S|
+-+-+-+-+-+-+-+-+-+-+-+-+-+-+-+-+-+-+-+-+-+-+-+-+-+-+-+-+-+-+-+-+
|  TP  |  flow_label |e| reserved|         private_user_data     |
+-+-+-+-+-+-+-+-+-+-+-+-+-+-+-+-+-+-+-+-+-+-+-+-+-+-+-+-+-+-+-+-+
|                           payload data                    ....
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|C|I|Q|F|P|FEC| TB  | DS  |R|RES|           packet_id           |
+-+-+-+-+-+-+-+-+-+-+-+-+-+-+-+-+-+-+-+-+-+-+-+-+-+-+-+-+-+-+-+-+
|                    packet_sequence_number                     |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
| TP |  flow_label |e| reserved|       private_user_data        |
+-+-+-+-+-+-+-+-+-+-+-+-+-+-+-+-+-+-+-+-+-+-+-+-+-+-+-+-+-+-+-+-+
|                          payload data                     ....
+-+-+-+-+-+-+-+-+-+-+-+-+-+-+-+-+-+-+-+-+-+-+-+-+-+-+-+-+-+-+-+-+
```

FIG. 5A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|C|Q|F|P|FEC| TB  | DS  |R|           delta_timestamp           |
+-+-+-+-+-+-+-+-+-+-+-+-+-+-+-+-+-+-+-+-+-+-+-+-+-+-+-+-+-+-+-+-+
|reduced_pckt_id|reduced_SeqNum |RefSeqNum| TP |  flow_label |e|
+-+-+-+-+-+-+-+-+-+-+-+-+-+-+-+-+-+-+-+-+-+-+-+-+-+-+-+-+-+-+-+-+
|       private_user_data       |         payload data      ...
+-+-+-+-+-+-+-+-+-+-+-+-+-+-+-+-+-+-+-+-+-+-+-+-+-+-+-+-+-+-+-+-+
```

FIG. 5B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|C|I|f_i|A|R|P|E|          length          |          type      |
+-+-+-+-+-+-+-+-+-+-+-+-+-+-+-+-+-+-+-+-+-+-+-+-+-+-+-+-+-+-+-+-+
|  data_offset  |  frag_count   |  numDU  |       DU_offset     |
+-+-+-+-+-+-+-+-+-+-+-+-+-+-+-+-+-+-+-+-+-+-+-+-+-+-+-+-+-+-+-+-+
|  ...  |           DU_offset           |         ....          |
+-+-+-+-+-+-+-+-+-+-+-+-+-+-+-+-+-+-+-+-+-+-+-+-+-+-+-+-+-+-+-+-+
|                   payload_sequence_number                     |
+-+-+-+-+-+-+-+-+-+-+-+-+-+-+-+-+-+-+-+-+-+-+-+-+-+-+-+-+-+-+-+-+
|                       header_extension                        |
+-+-+-+-+-+-+-+-+-+-+-+-+-+-+-+-+-+-+-+-+-+-+-+-+-+-+-+-+-+-+-+-+
|                       payload data                       .... |
+-+-+-+-+-+-+-+-+-+-+-+-+-+-+-+-+-+-+-+-+-+-+-+-+-+-+-+-+-+-+-+-+
```

FIG. 6A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|C|f_i|E|    type     | data_offset | frag_count  |RefSNum|
+-+-+-+-+-+-+-+-+-+-+-+-+-+-+-+-+-+-+-+-+-+-+-+-+-+-+-+-+-+-+-+-+
|                       header_extension                        |
+-+-+-+-+-+-+-+-+-+-+-+-+-+-+-+-+-+-+-+-+-+-+-+-+-+-+-+-+-+-+-+-+
|                       payload data                       .... |
+-+-+-+-+-+-+-+-+-+-+-+-+-+-+-+-+-+-+-+-+-+-+-+-+-+-+-+-+-+-+-+-+
```

METHOD AND APPARATUS FOR PACKET HEADER COMPRESSION

CROSS-REFERENCE TO RELATED APPLICATIONS

This application claims the benefit, under 35 U.S.C. § 365 of International Application PCT/IB2013/002615, filed 22 Nov. 2013, which was published in accordance with PCT Article 21(2) on 23 Oct. 2014 in English, and which claims the benefit of EP Application number EP13305502.0 filed Apr. 17, 2013.

TECHNICAL FIELD

This invention relates to a method and an apparatus for generating a compressed transport packet header, and a method and apparatus for processing the same.

BACKGROUND

In communication networks, one of the most expensive resources is bandwidth. Audio and video compression methods have been developed to effectively reduce the amount of data to be transmitted over the communication networks. In addition, it is important to reduce the overhead introduced by the use of transport protocols. More specifically, it is important to reduce the size of transport packet headers.

SUMMARY

The present principles provide a method of transmitting data, comprising the steps of: encapsulating at least one of video data and audio data in a datastream comprising a plurality of transport packets, each transport packet comprising a header portion and a payload portion; determining whether a particular transport packet can be transmitted using one of a full size packet header format and a reduced sized packet header format; forming transport packets for the datastream in response to the determining step; and transmitting the formed transport packets as described below. The present principles also provide an apparatus for performing these steps.

The present principles also provide a method of receiving data, comprising the steps of: receiving a datastream, which includes at least one of video data and audio data, comprising a plurality of transport packets, each transport packet comprising a header portion and a payload portion; determining whether a particular transport packet uses one of a full size packet header format and a reduced sized packet header format; and decoding transport packets for the datastream in response to the determined format as described below. The present principles also provide an apparatus for performing these steps.

The present principles also provide a computer readable storage medium having stored thereon instructions for transmitting or receiving data, according to the methods described above.

DETAILED DESCRIPTION

MPEG-H part 1 standard (also known as MPEG Multimedia Transport or MMT) defines a complete solution for packaging, transport and composition of timed and non-timed media content. MMT is currently under development, with a draft standard described in "Text of ISO/IEC 2nd CD 23008-1 MPEG Media Transport, MPEG/N13293," Geneva, Switzerland, January 2013 (hereinafter "MMT_CD").

While MMT primarily addresses IP networks, it also supports delivery of content over any type of packet-based networks. In particular, MMT may be used for delivery of audiovisual services over broadcast networks such as terrestrial, cable or satellite networks.

In MMT, the term "Asset" refers to a data entity containing data with the same transport characteristics and that is composed of one or more MPUs (media processing units) with same Asset ID, the term "Package" refers to a logical collection of data, which is composed of one or more Assets and their related Asset Delivery Characteristics (i.e., description about required Quality of Service for delivery of Assets), and an Composition Information (i.e., description of spatial and temporal relationship among Assets).

MMT packaging and transport capabilities are defined in two protocols, namely, MMT-Payload Format (MMT-PF) and MMT-Transport Protocol (MMT-TP). Specifically, MMT-PF defines a generic payload format for packetizing content components (for example, audio, video, and files) of a multimedia package. MMT-PF is agnostic to specific media codecs used for coding media data, and is also used to packetize signaling messages and Forward Error Correction (FEC) information. MMT payload format can be used for any packet-based transport protocols such as RTP or MMT transport protocol. MMT-TP defines a transport protocol supporting streaming delivery of Package through packet-based heterogeneous delivery network including IP network environments. The MMT protocol provides essential features for delivery of Package such as protocol level multiplexing that enables various Assets to be delivered over a single MMT packet flow, delivery timing model independent of presentation time to adapt to a wide range of network jitter, and information to support Quality of Service.

Figure 1A:
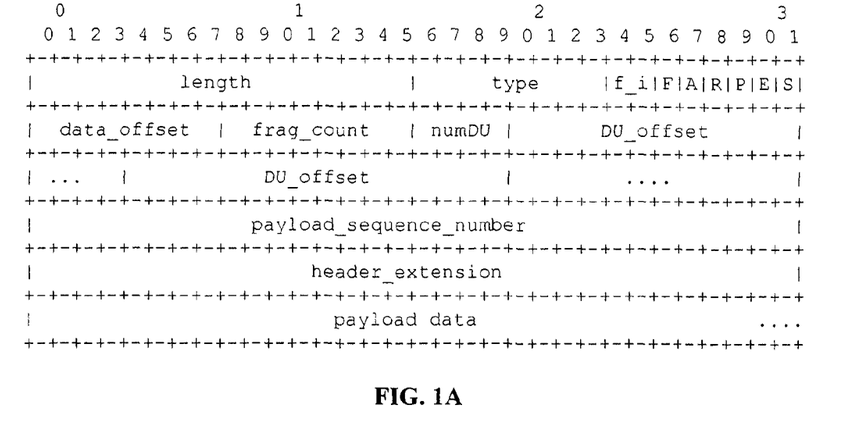
FIG. 1A is a pictorial example depicting structure of MMT (MPEG Multimedia Transport) payload header followed by payload data.
Figure 1B:
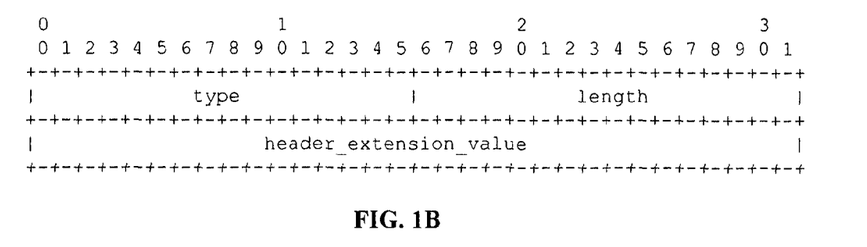
FIG. 1B is a pictorial example depicting structure of MMT payload header extension.

FIGS. 1A and 1B show the structure of MMT payload header followed by payload data and structure of MMT payload header extension, respectively, according to the MMT-PF protocol. In the present application, the payload header is also referred to as MMT-PF header. A complete description of semantics can be found in MMT_CD. The semantics of some fields shown in FIGS. 1A and 1B, which may be removed or modified according to the present principles, are reproduced below.

length (16 bits)—This field indicates the length of the payload in bytes excluding the header. This doesn't include the size of padding data.

f_i (2 bits)—This field indicates the fragmentation indicator contains information about fragmentation of data unit in the payload.

fragmentation_flag (F: 1 bit)—Set to '1', if fragment_counter is present.

aggregation_flag (A: 1 bit)—Set to '1', if aggregation_info is present.

RAP_flag (R: 1 bit)—Set to '1', if payload contains random access point (or part thereof).

payload_sequence_flag (P: 1 bit) Set to '1', if payload_sequence_number is present.

number_data_unit (numDU: 4 bits)—This field specifies the number of data unit within this MMT payload. This field shall be '0', if fragmentation_flag is set to '1'.

DU_offset (16 bits)—This field specifies location of each data unit from the byte indicated by data_offset. This field shall be used, when aggregation_flag is set to '1'.

payload_sequence_number (32 bits)—This field specifies the sequence number of payload associated with the same Asset.

Figure 2:
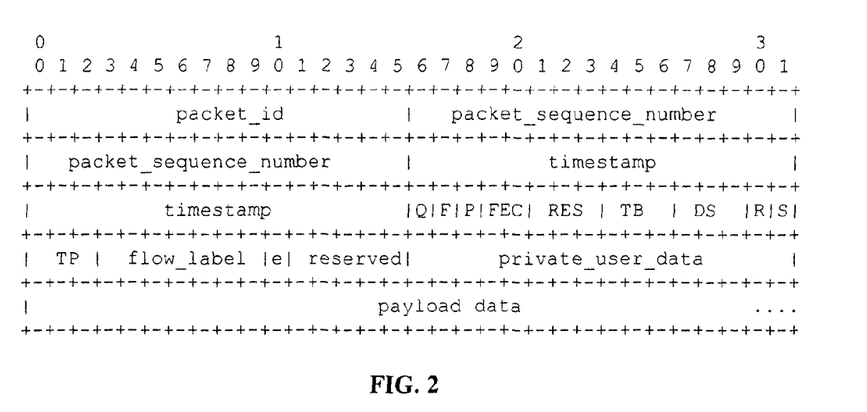
FIG. 2 is a pictorial example depicting structure of MMT packet header.

FIG. 2 shows the structure of MMT packet header according to the MMT-TP protocol. A complete description of semantics can be found in MMT_CD. In the present application, the MMT packet header is also referred to as MMT-TP header. The semantics of some fields shown in FIG. 2, which may be removed or modified according to the present principles, are reproduced below.

packet_id (16 bits)—This field is an integer value assigned to each Asset to distinguish packets of one Asset from another.

packet_sequence_number (32 bits)—This field is an integer value that is scoped by the packet_id and that starts from arbitrary value incremented by one for each MMT packet. It wraps around to '0' after its maximum value.

timestamp (32 bits)—This field specifies the time instance of MMT packet delivery. The NTP (Network Time Protocol) time is used in timestamp as specified as the "short-format" in clause 6 of IETF RFC5905, NTP version 4. This timestamp is measured at the first bit of MMT packet.

Both MMT-PF and MMT-TP include variable size headers with a minimum size of 9 bytes for MMT-PF (with usual presence of sequence number) and 12 bytes (and 3 bits) for MMT-TP. Since MMT-PF and MMT-TP may be used to transport very small packet payloads, those extra 21 bytes spent on headers may represent a very high overhead.

In order to reduce the size of headers, technique such as Robust Header Compression (RoHC defined in RFC 3095) may be used. While RoHC can effectively reduce the size of headers, it relies on complex coding techniques that may require heavy computation on the receiver side and it forces the receiver to decode all headers even when the receiver only needs to examine a portion of the headers for packet filtering purposes.

The present principles provide a method and apparatus that address the issues discussed above and can significantly reduce the header size with a low computational complexity.

In one embodiment, a header may be sent with or without compression. In the present application, a header without compression is referred to as a "full size header" or "full header," and a header that is compressed is referred to as a "reduced size header" or "reduced header." To differentiate whether header compression is used, a field, designated as a c field in the present embodiments, can be added, for example, at the beginning of the header. In one example, when c is set to 0, the header includes a "full size" header, and when c is set to 1, the header includes a "reduced size" header.

To form a reduced size header, some fields in a full size header may be removed, some fields may be represented with fewer bits than the full header, and new fields may be added. The order of the fields in the header may also be changed. In the following, exemplary embodiments of header compression for MMT-TP and MMP-PF are discussed in further detail.

MMT-TP Header

Figure 3:
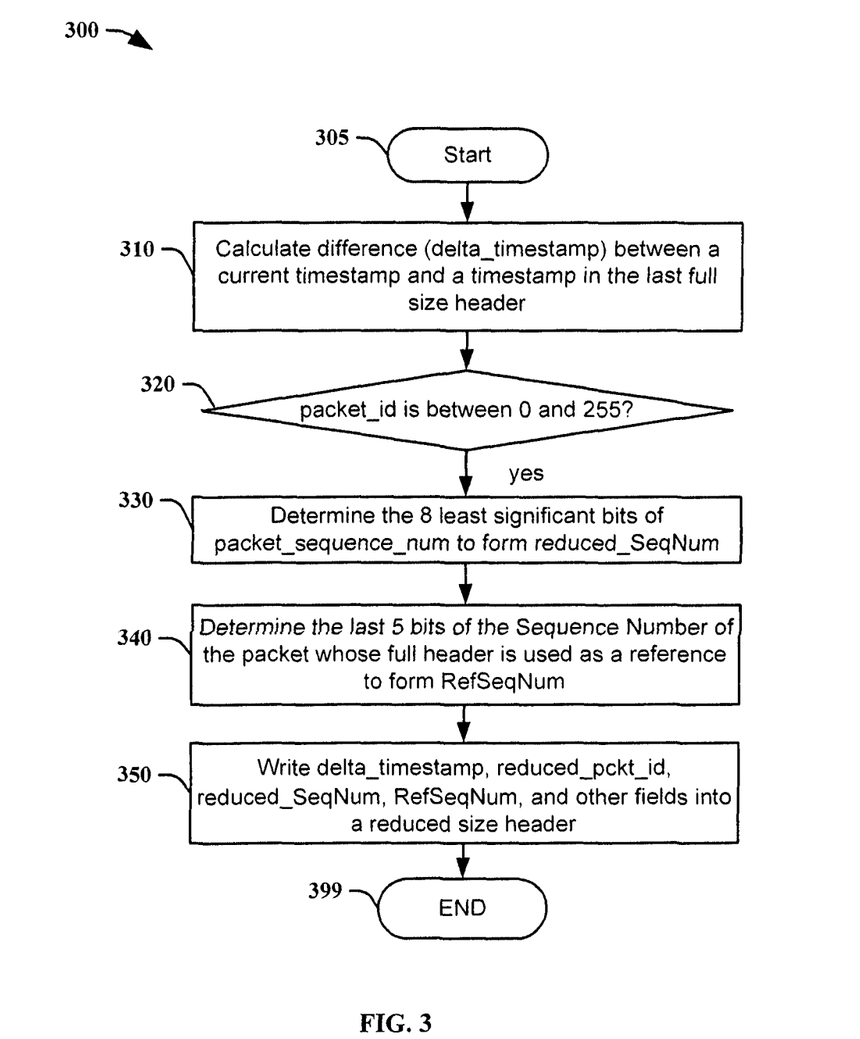
FIG. 3 is a flow diagram depicting an exemplary method for generating a reduced header, in accordance with an embodiment of the present principles.

FIG. 3 illustrates an exemplary method 300 for generating a reduced MMT-TP header. Method 300 starts at step 305. At step 310, a delta_timestamp field is used to represent the timestamp. Although it is costly in terms of bits, the timestamp information associated with a packet needs to be preserved.

The delta_timestamp field contains the difference between the timestamp field of a reference full size header and the value that would be in the current timestamp field if a full header were used. In one embodiment, a full size header may be inferred to be a reference header based on rules known to both the receiver and transmitter, for example, the last received full size header is used as a reference header. In another embodiment, a full size header may be indicated explicitly to be a reference header. The difference between timestamps is coded in a way similar to the 19 least significant bits of an NTP timestamp. This keeps the same timestamp precision with a duration of 8 seconds. If the difference between these two timestamps is larger than 8 seconds (and therefore goes beyond the maximum duration that can be coded with 19 bits), then a packet with a full header is sent in order to provide a new timestamp reference value for further packets with reduced size headers.

The packet_id field in a full header is replaced by a reduced_pckt_id field. The reduced_pckt_id field uses 8 bits rather than 16 bits in the full header. Therefore, this reduction from 16-bit packet ids to 8-bit ids restricts the use of the reduced header for streams whose packet_id is between 0 and 255. Thus, at step 320, it checks whether packet_id is between 0 and 255. If yes, method 300 sets a value for reduced_pckt_id and continues with the generation of the reduced header. If not, the proposed header reduction mechanism cannot be used and a full header should be generated.

At step 330, a reduced_SeqNum field is used to represent the packet sequence number. The reduced_SeqNum field contains the 8 least significant bits of the packet_sequence_number field that would be in the header if a full size header were used. Since this new field is coded by 8 bits, the present principles mandate that for each stream (identified by the same packet_id) a packet with a full size header shall be sent at least every 256 packets.

At step 340, a new field, RefSeqNum is generated. RefSeqNum contains the last 5 bits of the Sequence Number of the packet whose full header is used as a reference. This new field brings additional robustness by allowing the receiver to check if the last full header received is actually the one that shall be used as a reference for the current reduced size header. Since a packet may be dropped, field Ref SeqNum provides a mechanism to make sure that when a full header reference has not been received, the receiver does not try to improperly decode the reduced header.

Figure 5A:
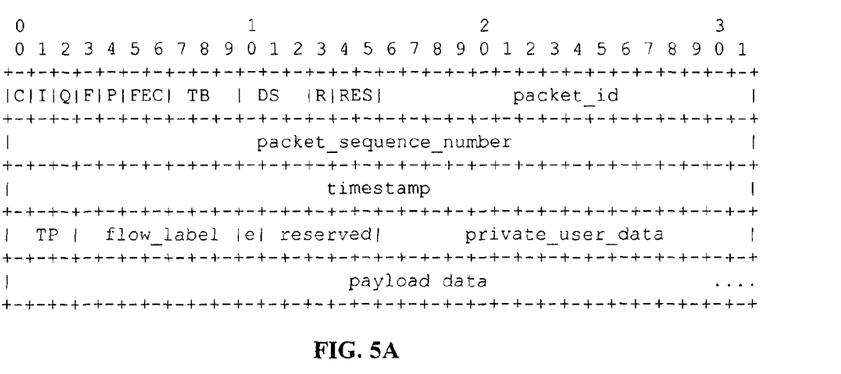
FIG. 5A is a pictorial example depicting structure of a modified MMT packet with a full header.
Figure 5B:
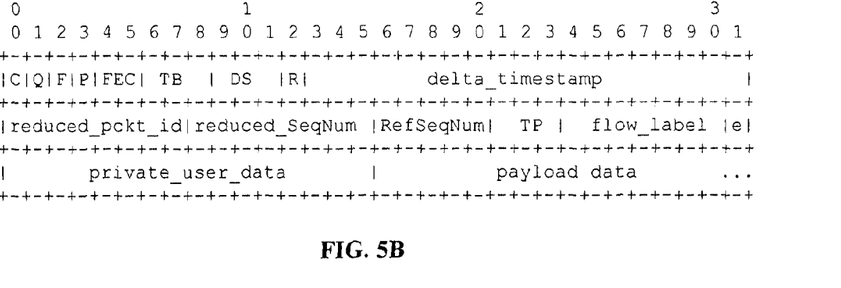
FIG. 5B is a pictorial example depicting structure of a modified MMT packet with a reduced header, in accordance with an embodiment of the present principles.

At step 350, fields "delta_timestamp," "reduced_pckt_id," "reduced_SeqNum," "RefSeqNum," and other field are written into the reduced size header, for example, according to a format shown in FIG. 5B. Method 300 ends at step 399.

Note that the steps in method 300 may proceed at a different order from what is shown in FIG. 3, for example, steps 310-340 may be performed in any order.

Figure 4:
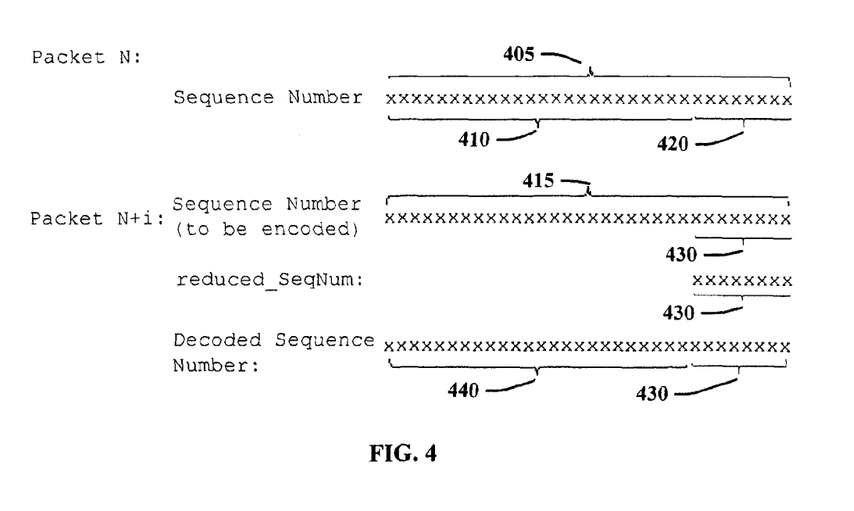
FIG. 4 is a pictorial example depicting that bits in a sequence number of a full sized header are used to generate reduced_SeqNum for a reduced header, and that reduced_SeqNum is used to decode a sequence number for the reduced header, in accordance with an embodiment of the present principles.

FIG. 4 illustrates that bits in a sequence number are used to generate field "reduced_SeqNum," and field "reduced_SeqNum" is used to decode the sequence number in a reduced header using an example. In this example, current packet N+i is to be sent, and a last full size header is received in packet N. At the transmitter side, only the 8 least significant bits (430) of the sequence number (415) are kept to generate field "reduced_SeqNum", which reduces the required processing.

Decoding at the receiver side is more complex than encoding at the transmitter side. First, the de-compressor needs to store the sequence number (405), or the 24 most significant bits of the sequence number (410), of the packet that is used as a reference. The de-compressor may also need to store the 8 least significant bits (430) of the sequence number as an initial value for reduced_SeqNum. Then for each received reduced header the decoder needs to track if the reduced_SeqNum is looped through 0. The complete sequence number of a reduced header packet is then obtained by appending the reduced_SeqNum (430) to the 24 most significant bits (440) of the reference sequence number (incremented by 1 if reduced_SeqNum has been looped through 0). That is, the bits shown in 440 equal the bits shown in 410 when reduced_SeqNum has not been looped through 0, and is greater than the bits shown in 410 by 1 otherwise.

FIG. 5A illustrates the proposed full MMT-TP header, and FIG. 5B illustrates the proposed reduced MMT-TP header, according to the present principles. Compared with the MMT-TP header shown in FIG. 2, fields "Q," "F," "P," "FEC," "RES," "TB," "DS," and "R" are moved to the beginning of the proposed full MMT-TP header and their sizes and semantics are not changed, field "s" is removed, and fields "c" and "I" are added. "I" flag is used to indicate whether the current header information shall be stored since it will be later used as a reference, and it has been added to full MMT-PF and MMT-TP headers.

The order of the fields is also adjusted. Since flag "c" indicates what kind of header will be used, it needs to be the first information determined by the decoder. Assuming a decoder will determine first bit first, using the first bit for flag "C" enables the decoder to first determine what kind of header will follow.

Comparing the proposed reduced MMT-TP header as shown in FIG. 5B with the full MMT-TP header as shown in FIG. 5A, fields "packet_id," "packet_sequence_number," and "timestamp" have been replaced with "reduced_pckt_id," "reduced_SeqNum," and "delta_timestamp," respectively, field "RefSeqNum" has been added, and fields "I," "RES," and "reserved" have been removed. Consequently, the minimum MMT-TP header size is decreased from 99 bits to 56 bits, which represents a 43% bit saving.

MMT-TP streams are identified by their packet_id and each stream has its own packet_sequence_number sequence. Therefore, by applying the header reduction mechanism on a limited number of streams (packet_id between 0 and 255), the combination of RefSeqNum and reduced_pckt_id fields identifies in a unique way the reference packet that shall be used for the decoding of a reduced size header.

Moreover, since reduced_pckt_id is nothing but a copy of packet_id field with a smaller range of possible values, traditional packet filtering usually achieved by filtering on packet_id can be operated the same way on reduced_pckt_id. In one example, filtering consists in looking at some fields in order to decide whether or not a packet should be transmitted or received. When using techniques such as RoHC, in order to read one field of the header, the whole header needs to be uncompressed. By contrast, with our proposed technique, only the desired field needs to be uncompressed. That is, filtering can be done directly on reduced_packet_id without reconstructing original packet_id. Therefore the header compression technique according to the present principles is totally transparent on packet filtering.

MMT-PF Header

Header compression usually offers interest for large and repetitive headers. Specific to MMT, header compression may provide significant bit savings for FEC repair symbols or when a single MPU is transported in several fragments. Thus, we design the reduced header for some specific usage scenarios that may benefit from header compression. Considering the usage scenarios, we propose a reduced size MMT-PF header in the following.

(1) The A, number_data_unit, and DU_offset fields are removed since aggregation is not supported by a reduced size header. Consequently full headers shall be used when aggregation is used.

(2) The R flag is removed since a full header shall always be used when a Random Access Point (RAP) is present in the payload. This ensures that packets with RAP can be decoded on their own (without relying on the encoding of other "reference" packet).

(3) The P and payload_sequence_number fields have been removed as all packets with reduced headers shall share the same payload_sequence_number of their "reference" packet.

(4) The length field is removed as header compression is used only on same size fragments. Consequently, the first fragment shall use a full header and any fragment with a size different from "reference" fragment (usually first fragment, but it is not mandatory) shall use a full header too.

(5) The RefSNum field contains the last 4 bits of the Payload Sequence Number of the packet whose full header is used as a reference. This brings additional robustness by allowing the receiver to check if the last full header received is actually the one that shall be used as a reference for the current reduced size header. Since a packet may be dropped, this provides a mechanism to make sure that when a full header reference has not been received, the receiver does not try to improperly decode the reduced header.

Figure 6A:
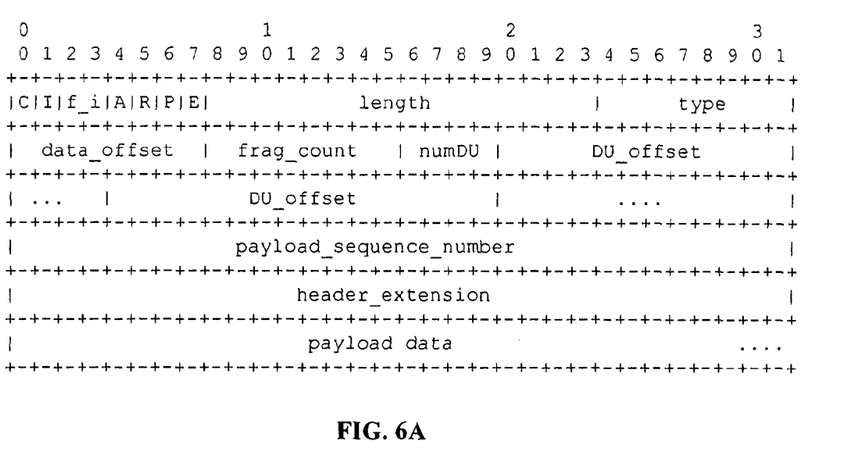
FIG. 6A is a pictorial example depicting structure of a modified MMT payload header followed by payload data.
Figure 6B:
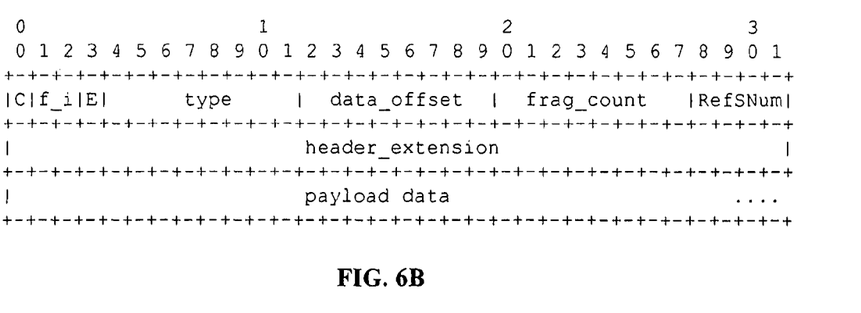
FIG. 6B is a pictorial example depicting structure of a reduced MMT payload header followed by payload data, in accordance with an embodiment of the present principles.

FIG. 6A illustrates the proposed full MMT-PF header, and FIG. 6B illustrates the proposed reduced MMT-PF header. Compared with the MMT-PF header shown in FIG. 1A, fields "f_i," "A," "R," "P," and "E" are moved to the beginning of the proposed full MMT-PF header, and their sizes and semantics do not change. Flags "F" and "s" are removed, and fields "C" and "I" are added. The order of the fields is also adjusted. Comparing the proposed reduced MMT-PF header as shown in FIG. 6B with the full MMT-PF header as shown in FIG. 6A, fields "I," "A," "R," "P," "length," "numDU," "DU_offset," and "payload_sequence_number" are removed, and field "RefSNum" is added. Consequently, the minimum MMT-PF header size is decreased from 128 bits to 32 bits, which represents a 75% bit saving.

In many applications, all fragments except for the last fragment of a same asset will have the same size and therefore a full size header can be used only in first and last fragments and all other fragments may use reduced headers while using the first fragment as a reference.

As discussed above, different methods have been used to provide efficient and robust header compression for MMT-PF and MMT-TP. In one embodiment, a difference between the current field and the reference field, for example, delta_timestamp, is used in a reduced header. By using the difference rather than the field itself, fewer bits can be used to represent the field. In another embodiment, the least significant bits of the current field, for example, reduced_SeqNum, is used to represent the current field. When such a field is received, the most significant bits of a reference field is needed to de-compress the field. These two embodiments, that is, using a difference and using the least significant bits, both represent the current field differentially to achieve header compression efficiency. In another embodiment, an arrangement according to the present principles determines the typical usage scenarios that may benefit from header compression and further determines that some fields can be removed in a reduced header. In addition, fewer bits are used to represent a current field (for example, reduced_pckt_id) in a reduced header, which may impose constraints on the values that can be represented by the current field. The present principles recognize constraints on using reduced headers and provide rules and guidelines on setting values for the fields.

Figure 7:
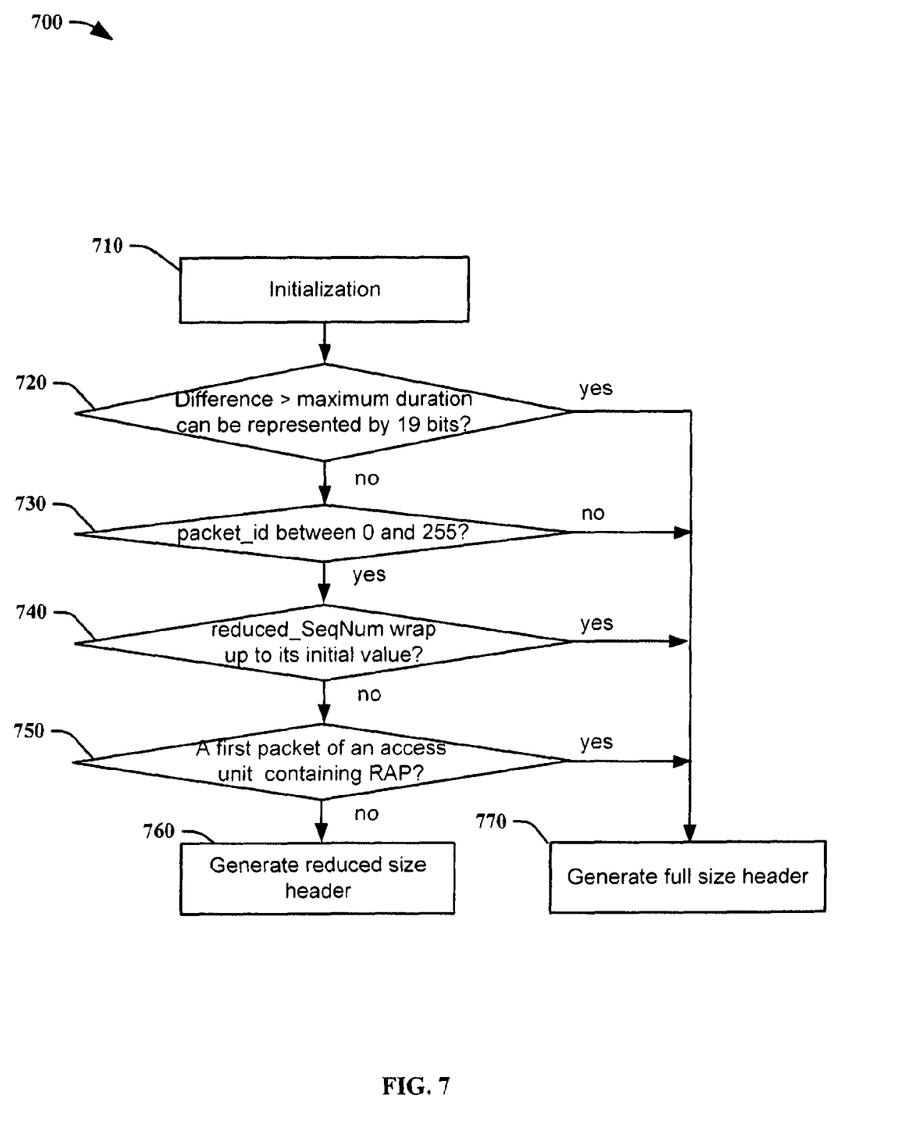
FIG. 7 is a flow diagram depicting an exemplary method for determining whether to use a full header or a reduced header, in accordance with an embodiment of the present principles.

As discussed above, there are rules and constraints for using reduced headers. FIG. 7 illustrates an exemplary method 700 for determining whether to use a reduced header or a full size header considering the rules and constraints. This method is performed, for example, in an encoder that encodes the headers associated with a transport stream according to MMT-TP. Method 700 starts at step 710 that performs initialization.

At step 720, it checks whether the difference between the timestamp of the current packet and the timestamp of the reference packet is larger than 8 seconds (and therefore cannot be coded on the 19-bit delta_timestamp field). If yes, method 700 generates a full size header at step 770.

At step 730, it checks whether packet_id is in the range between 0 and 255. If not, the value of packet_id is beyond what can be properly represented by reduced_pckt_id and method 700 generates a full size header at step 770.

At step 740, it checks for each stream (identified by packet_id) whether the reduced_SeqNum is wrapping up to its initial value. If yes, method 700 generates a full size header at step 770 to provide a reference sequence number for further packets using reduced headers.

At step 750, it checks whether the packet is the first packet of an access unit which contains a Random Access Point (RAP). If yes, method 700 generates a full size header at step 770. Otherwise, a reduced header is generated at step 760.

The steps in method 700 may proceed at a different order from what is shown in FIG. 7, for example, steps 720-750 may be performed in any order. Method 700 may also choose to generate a full size header in other conditions, for example, based on a user request.

To determine whether a full size header or a reduced header can be used for MMT-PF, the following conditions can be considered:

(1) Aggregation mechanism is used;
(2) A Random Access point (RAP) is present;
(3) A new payload sequence number is used;
(4) The length value of the current packet is different from the length value of the reference packet.

When at least one of the above conditions is met, a full MMT-PF header should be sent. A full MMT-PF header can also be sent in other conditions, for example, based on a user request.

At the receiver side, a receiver performing a method according to the present principles determines whether a full size header or a reduced header is used, for example, using "C" flag. The receiver stores important information, for example, what is required for de-compressing the header, from full headers when such headers are marked as references.

Figure 8:
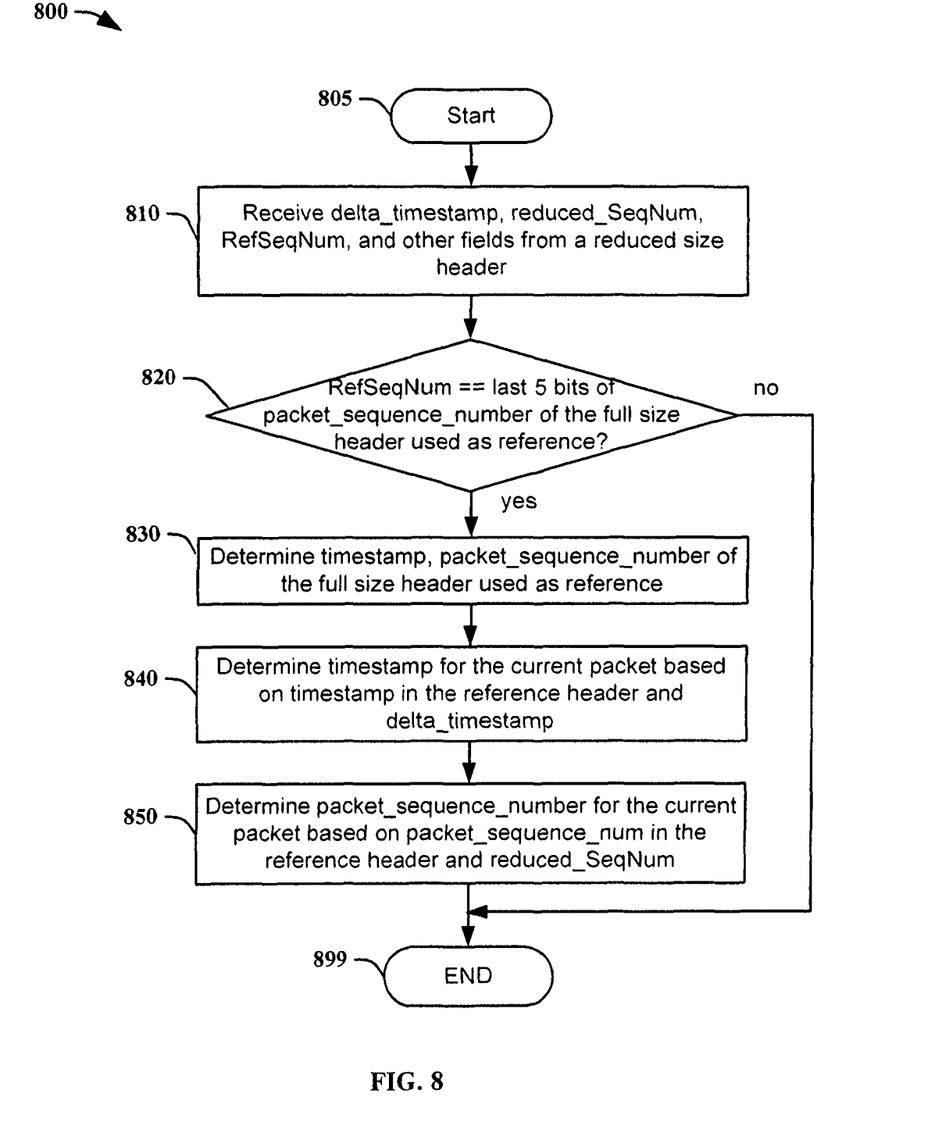
FIG. 8 is a flow diagram depicting an exemplary method for de-compressing a reduced header, in accordance with an embodiment of the present principles.

FIG. 8 illustrates an exemplary method 800 for de-compressing a reduced size MMT-PT header. Method 800 starts at step 805. At step 810, it receives a reduced header and parses fields, for example, but not limited to, "delta_timestamp," "reduced_SeqNum," and "RefSeqNum" from the reduced size header. At step 820, it checks whether the last 5 bits of the packet_sequence_number of the full size header used as a reference is the same as Ref SeqNum. If they are not the same, the reduced size header cannot be properly decoded and method 800 ends at step 899. Otherwise, at step 830, it determines timestamp and packet_sequence_number of the full size so header that is used as a reference for the current reduced size header. At step 840, it determines timestamp for the current packet as a sum of timestamp in the reference full header and delta_timestamp. At step 850, it determines packet sequence number for the current packet based on packet_sequence_number of the full size header and reduced_SeqNum, for example, as illustrated in FIG. 4. Method 800 ends at step 899.

Using MMT-PF and MMT-TP headers as examples, we discuss how various embodiments can be used to efficiently compress the headers. Because of header compression, it is important that a correct reference field is used for proper decoding of a current field. To provide decoding robustness, a link to the reference field (for example, RefSeqNum) can be used to prevent improper decoding of reduced size headers. The present principles can also be used for header compression in other applications or protocols.

In various examples discussed above, specific values, for example, the number of bits for fields and flags, and specific orders of fields are described. These values, or orders may need to be adjusted accordingly when the present principles are applied in different applications or transport protocols.

Coded packets in reduced headers according to the present principles can be easily filtered without complex header decoding of all packets. Thus, the present principles provide the advantage of network transparency. In addition, with the use of simple header compression mechanisms, the present principles can be implemented at low computational complexity and do not require significant processing at the receiver.

Figure 9:
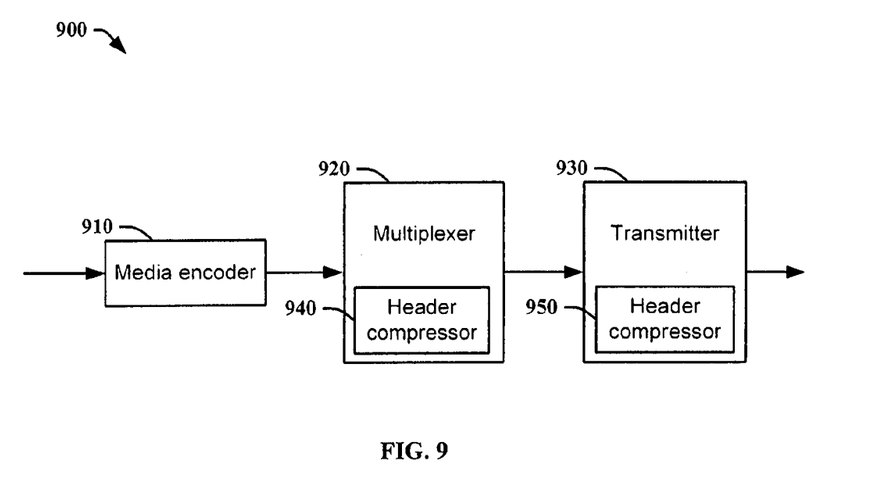
FIG. 9 is a block diagram depicting an exemplary transmitting system, in accordance with an embodiment of the present principles.

FIG. 9 illustrates an exemplary transmitting system 900. The input data, for example, but not limited to, audio and video data, are encoded at media encoder 910. The encoded data is multiplexed at multiplexer 920, and transmitted at transmitter 930. The header compression mechanism according to the present principles, for example, methods 300 and 700, can be used in a header compressor (940, 950) that is located in multiplexer 920 or transmitter 930. The transmitting system may be used in a typical broadcast TV environment where bandwidth is an expensive resource, or may be used in a mobile device that provides audiovisual service. By using header compression at the multiplexer 920, following the media encoding process, it is possible to prepare header compression in advance since MMT-PF flow may be stored in a file format before actual transmission. At transmitter 930, the system may re-use MMT-PF header compression (with possible updates) and also use MMT-TP header compression before sending the actual MMT-TP packets.

Figure 10:
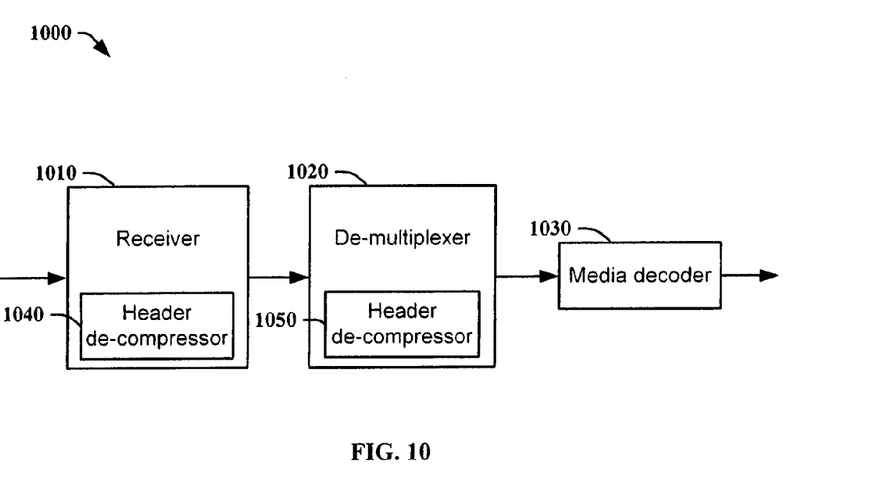
FIG. 10 is a block diagram depicting an exemplary receiving system, in accordance with an embodiment of the present principles.

FIG. 10 illustrates an exemplary receiving system 1000. The input data of system 1000 may be a transport bitstream, for example, the output of system 900. The data is received at receiver 1010, de-multiplexed at de-multiplexer 1020, and then decoded at media decoder 1030. When receiving MMT-TP packets, header de-compressor (1040, 1050) performs MMT-TP header de-compression by storing header information from reference packets and decoding reduced headers. Decoded packets can be placed in a buffer of de-multiplexer 1020. When processing MMT-PF payloads, the de-multiplexer 1020 may apply MMT-PF header de-compression.

Figure 11:
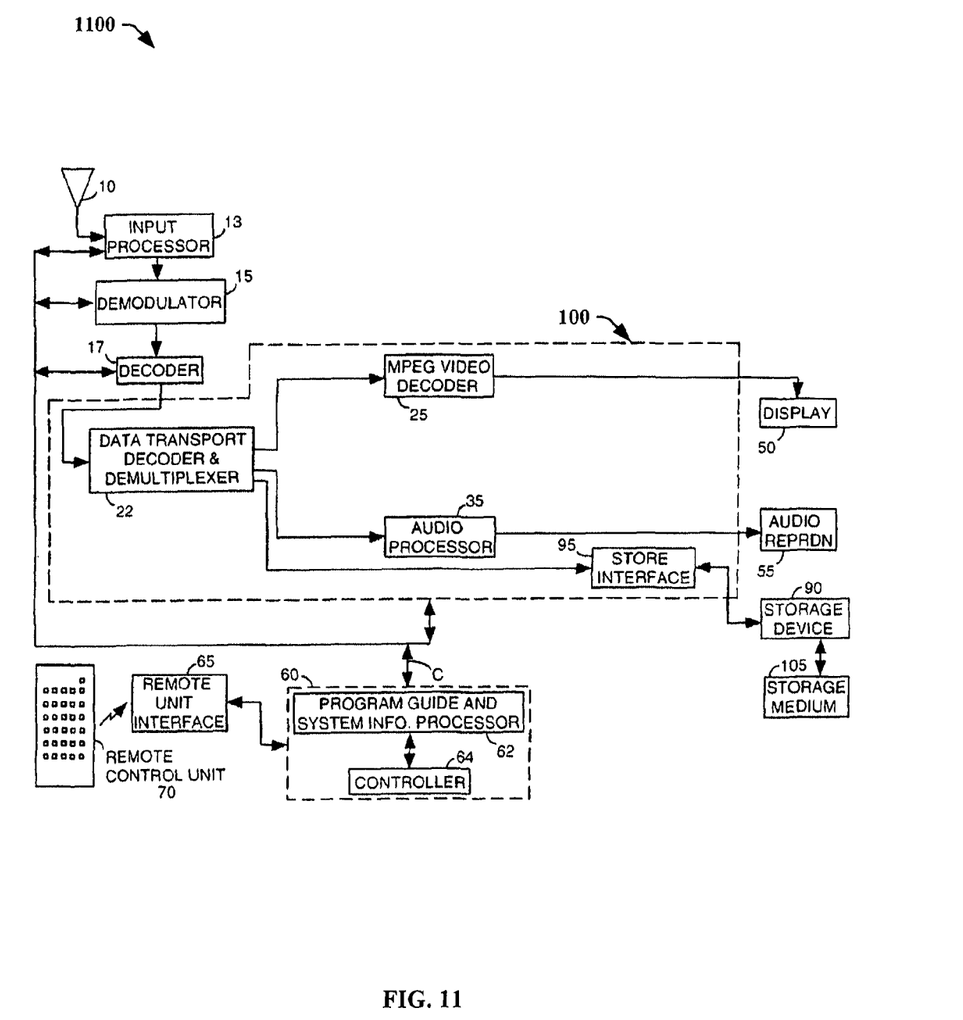
FIG. 11 is a block diagram depicting another exemplary receiving system, in accordance with an embodiment of the present principles.

FIG. 11 illustrates another exemplary receiving system 1100. In overview, in the video receiver system of FIG. 11, a broadcast carrier modulated with signals carrying audio, video and associated data representing broadcast program content is received by antenna 10 and processed by unit 13. The resultant digital output signal is demodulated by demodulator 15. The demodulated output from unit 15 is trellis decoded, mapped into byte length data segments, deinterleaved and Reed-Solomon error corrected by decoder 17. The output data from unit 17 is in the form of an MPEG compatible transport datastream, for example, an MMT transport stream, containing program representative multiplexed audio, video and data components. The transport stream from unit 17 is demultiplexed into audio, video and data components by unit 22 which are further processed by the other elements of decoder 100.

If header compression technique, for example, MMT-PF and MMT-TP header compression, is used, unit 22 performs header decompression before de-multiplexing the stream and sending elementary streams to unit 25, 35, or 95. In one mode, decoder 100 provides MPEG decoded data for display and audio reproduction on units 50 and 55, respectively. In another mode, the transport stream from unit 17 is processed by decoder 100 to provide an MPEG compatible datastream for storage on storage medium 105 via storage device 90.

A user selects for viewing either a TV channel or an on-screen menu, such as a program guide, by using a remote control unit 70. Processor 60 uses the selection information provided from remote control unit 70 via interface 65 to appropriately configure the elements of FIG. 11 to receive a desired program channel for viewing. Processor 60 comprises processor 62 and controller 64. Unit 62 processes (i.e. parses, collates and assembles) program specific information including program guide and system information and controller 64 performs the remaining control functions required in operating decoder 100. Although the functions of unit 60 may be implemented as separate elements 62 and 64 as depicted in FIG. 11, they may alternatively be implemented within a single processor. For example, the functions of units 62 and 64 may be incorporated within the programmed instructions of a microprocessor. Processor 60 configures processor 13, demodulator 15, decoder 17 and decoder system 100 to demodulate and decode the input signal format and coding type.

Considering FIG. 11, in detail, a carrier modulated with signals carrying program representative audio, video and associated data received by antenna 10, is converted to digital form and processed by input processor 13. Processor 13 includes radio frequency (RF) tuner and intermediate frequency (IF) mixer and amplification stages for downconverting the input signal to a lower frequency band suitable for further processing.

It is assumed for exemplary purposes that a video receiver user selects a sub-channel (SC) for viewing using remote control unit 70. Processor 60 uses the selection information provided from remote control unit 70 via interface 65 to appropriately configure the elements of decoder 100 to receive the physical channel corresponding to the selected sub-channel SC.

The output data provided to processor 22 is in the form of a transport datastream containing program channel content and program specific information for many programs distributed through several sub-channels.

Processor 22 matches the Packet Identifiers (PIDs) of incoming packets provided by decoder 17 with PID values of the video, audio and sub-picture streams being transmitted on sub-channel SC. These PID values are pre-loaded in control registers within unit 22 by processor 60. Processor 22 captures packets constituting the program transmitted on sub-channel SC and forms them into MPEG compatible video, audio streams for output to video decoder 25, audio decoder 35 respectively. The video and audio streams contain compressed video and audio data representing the selected sub-channel SC program content.

Processor 22 also detects whether header compression, for example, MMT-PF and MMT-TP header compression according to the present principles, is used and detects whether a packet provides a reference header for header compression. Processor 22 stores the reference header and uses it to decode reduced size headers.

Decoder 25 decodes and decompresses the MPEG compatible packetized video data from unit 22 and provides decompressed program representative pixel data to device 50 for display. Similarly, audio processor 35 decodes the packetized audio data from unit 22 and provides decoded audio data, synchronized with the associated decompressed video data, to device 55 for audio reproduction.

In a storage mode of the system of FIG. 11, the output data from unit 17 is processed by decoder 100 to provide an MPEG compatible datastream for storage. In this mode, a program is selected for storage by a user via remote unit 70 and interface 65.

Processor 60, in conjunction with processor 22 forms a composite MPEG compatible datastream containing packetized content data of the selected program and associated program specific information. The composite datastream is output to storage interface 95. Storage interface 95 buffers the composite datastream to reduce gaps and bit rate variation in the data. The resultant buffered data is processed by storage device 90 to be suitable for storage on medium 105. Storage device 90 encodes the buffered datastream from interface 95 using known error encoding techniques such as channel coding, interleaving and Reed Solomon encoding to produce an encoded datastream suitable for storage. Unit 90 stores the resultant encoded datastream incorporating the condensed program specific information on medium 105.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of transmitting data, comprising:
   encapsulating at least one of video data and audio data in a datastream comprising a plurality of transport packets, each transport packet comprising a header portion and a payload portion;
   determining whether a particular transport packet can be transmitted using one of a full size packet header format and a reduced size packet header format;
   forming transport packets for the datastream in response to the determined format, said formed transport packets including at least a first packet having a first header and a second packet having a second header, said first header corresponding to said full size packet header format and said second header corresponding to said reduced size packet header format,
   wherein a sequence number of the first packet is indicated in a first field of said first header by a plurality of bits,
   wherein a sequence number of said second packet, is indicated in a second field of said second header using least significant bits of another plurality of bits, said another plurality of bits corresponding to said sequence number of said second packet, and
   wherein a reference sequence number is indicated in a third field of said second header using least significant bits of said plurality of bits and is used to indicate that said second header uses said first header as a reference; and
   transmitting the formed transport packets.

2. The method of claim 1, wherein a field in the second header is differentially represented with respect to a corresponding field in the first header.

3. The method of claim 2, wherein the corresponding field in the first header is represented by a set of bits, and wherein the second header is generated by representing the field in the second header with least significant bits of the set of bits.

4. The method of claim 2, wherein the first header is formed when data to be represented in the field exceeds a maximum representation capacity of the number of bits included in the field.

5. The method of claim 1, wherein the first header includes a fourth field indicating that the first header is used as the reference.

6. A method of receiving data, comprising:
   receiving a datastream, which includes at least one of video data and audio data, comprising a plurality of transport packets, each transport packet comprising a header portion and a payload portion, said plurality of transport packets including at least a first packet having a first header and a second packet having a second header, the first header corresponding to a full size packet header format and the second header corresponding to a reduced size packet header format, wherein a sequence number of the first packet is indicated in a first field of said first header by a plurality of bits, wherein a sequence number of said second packet, is indicated in a second field of said second header using least significant bits of another plurality of bits, said another plurality of bits corresponding to said sequence number of said second packet, and wherein a reference sequence number is indicated in a third field of said second header using least significant bits of said plurality of bits;

determining that said first header is to be used as a reference for said second header based on a comparison between said sequence number in said first header and said reference sequence number in said second header; and decoding said second header, using said first header as the reference.

7. The method of claim 6, wherein the decoding comprises:

decoding a field in the second header responsive a corresponding field in the first header.

8. An apparatus for transmitting data, comprising:

a processor configured to:

encapsulate at least one of video data and audio data in a datastream comprising a plurality of transport packets, each transport packet comprising a header portion and a payload portion, and determine whether a particular transport packet can be transmitted using one of a full size packet header format and a reduced size packet header format, and form transport packets for the datastream in response to the determined format, said formed transport packets including at least a first packet having a first header and a second packet having a second header, said first header corresponding to said full size packet header format and said second header corresponding to said reduced size packet header format, wherein a sequence number of the first packet is indicated in a first field of said first header by a plurality of bits, wherein a sequence number of said second packet, is indicated in a second field of said second header using least significant bits of another plurality of bits, said another plurality of bits corresponding to said sequence number of said second packet, and wherein a reference sequence number is indicated in a third field of said second header using least significant bits of said plurality of bits and is used to indicate that said second header uses said first header as a reference; and a transmitter configured to transmit the formed transport packets.

9. The apparatus of claim 8, wherein a field in the second header is differentially represented with respect to a corresponding field in the first header.

10. The apparatus of claim 9, wherein the corresponding field in the first header is represented by a set of bits, and wherein the field in the second header is represented with least significant bits of the set of bits.

11. The apparatus of claim 9, wherein the first header is formed when data to be represented in the field exceeds a maximum representation capacity of the number of bits included in the field.

12. An apparatus for receiving data, comprising:

a receiver configured to receive a datastream, which includes at least one of video data and audio data, comprising a plurality of transport packets, each transport packet comprising a header portion and a payload portion, said plurality of transport packets including at least a first packet having a first header and a second packet having a second header, the first header corresponding to a full size packet header format and the second header corresponding to a reduced size packet header format, wherein a sequence number of the first packet is indicated in a first field of said first header by a plurality of bits, wherein a sequence number of said second packet, is indicated in a second field of said second header using least significant bits of another plurality of bits, said another plurality of bits corresponding to said sequence number of said second packet, and wherein a reference sequence number is indicated in a third field of said second header using least significant bits of said plurality of bits; and a processor configured to:

determine that said first header is to be used as a reference for said second header based on a comparison between said sequence number in said first header and said reference sequence number in said second header, and decode said second header, using said first header as the reference.

13. The apparatus of claim 12, the second header including a field, wherein said processor is configured to decode the field in the second header responsive a corresponding field in the first header.

14. The apparatus of claim 12, wherein the first header includes a fourth field indicating that the first header is used as the reference.

15. The apparatus of claim 13, wherein the corresponding field in the first header is represented by a set of bits, and wherein the field in the second header is decoded responsive to most significant bits of the set of bits and the received field, the decoded field in the second header having the same number of bits used to represent the corresponding field in the first header.

16. The apparatus of claim 13, wherein the second header in the second packet includes fewer fields than the first header in the first packet.

* * * * *